Aug. 11, 1925. 1,549,699
W. J. WILSON
MINING AND LOADING MACHINE
Filed Dec. 19, 1921   2 Sheets-Sheet 1
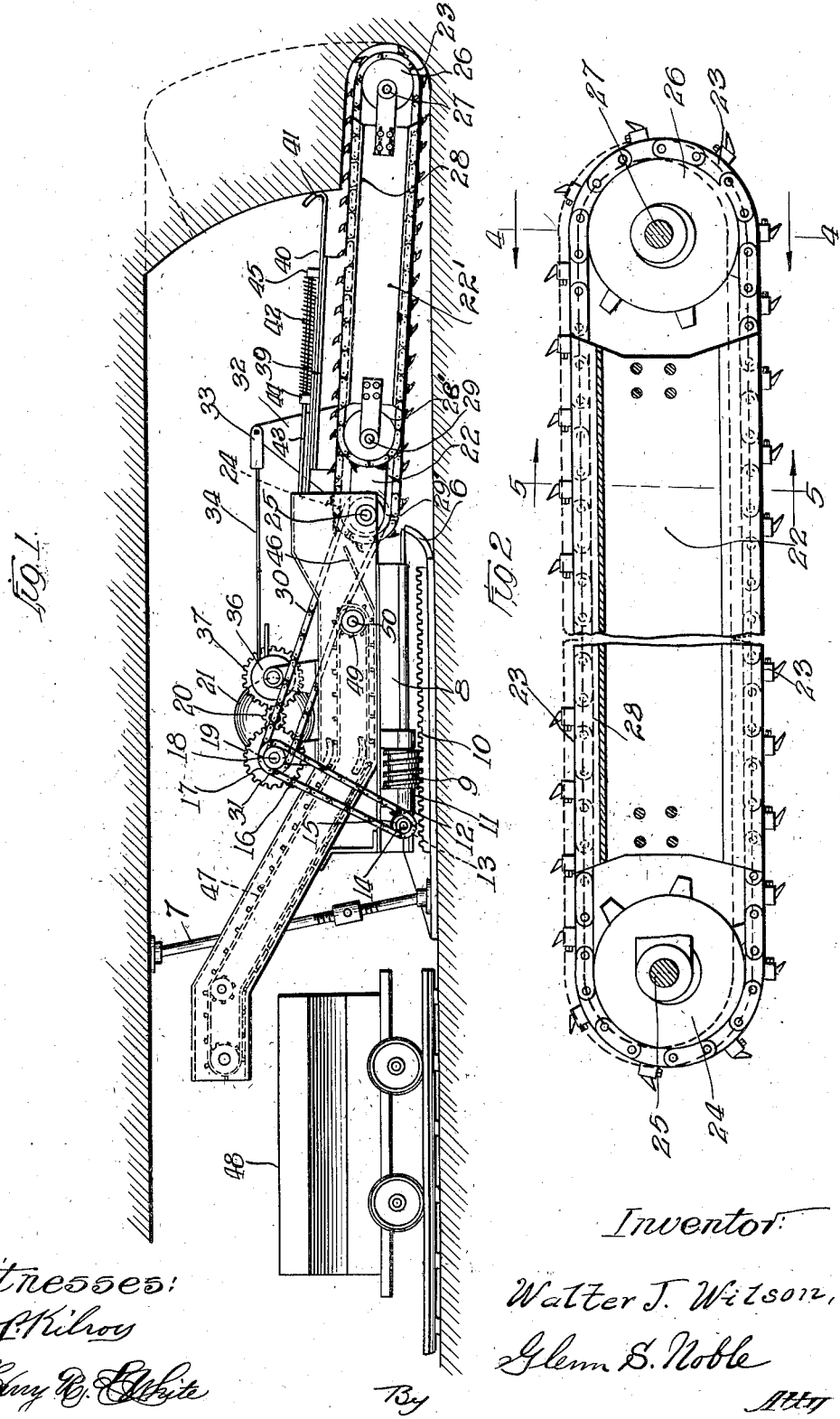

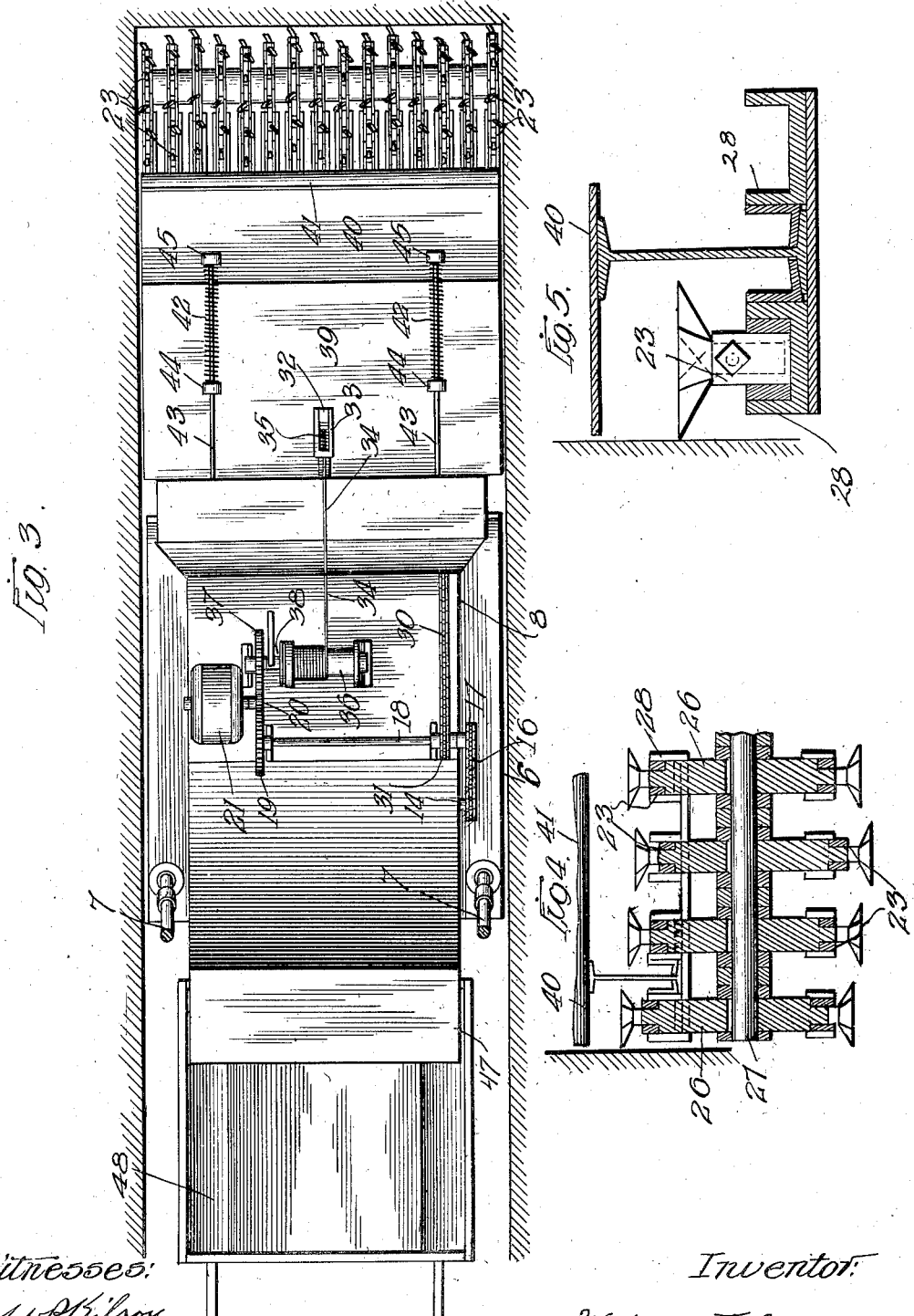

Patented Aug. 11, 1925.

1,549,699

UNITED STATES PATENT OFFICE.

WALTER J. WILSON, OF SEWICKLEY, PENNSYLVANIA.

MINING AND LOADING MACHINE.

Application filed December 19, 1921. Serial No. 523,451.

*To all whom it may concern:*

Be it known that I, WALTER J. WILSON, a citizen of the United States, residing at Sewickley, county of Allegheny and State of Pennsylvania, have invented certain new and useful Improvements in Mining and Loading Machines, of which the following is a specification.

This invention relates more particularly to a machine of the character set forth to mine or take out substantially all of the material, such as coal or the like, as distinguished from machines for cutting kerfs in the coal. One of the principal objects of this invention is to provide a machine which will mine the coal in a manner simulating the action of an expert miner as distinguished from machines which merely plane or scrape out the material, in other words, to provide a machine which will remove the coal by breaking out as much as possible and thereby producing relatively large pieces of excavated material. Another object is to provide a machine with a plurality of over-running cutter chains arranged to excavate all of the material within the path of the machine and means for receiving and conveying the excavated material to mine cars or the like. Another object is to provide an improved mining and loading machine which will be of comparatively simple construction and particularly efficient in operation and which will have such further advantages as will appear from the following description.

In the accompanying drawings illustrating this invention;

Figure 1 is a side view;

Figure 2 is an enlarged detail of the cutter arms;

Figure 3 is a plan view;

Figure 4 is a sectional detail of the chain sprockets; and

Figure 5 is a detail of the cutter chain.

The machine has a sub-base or frame 6 which is adapted to move or slide on the floor of the mine and which may be held in adjustable position by means of jacks 7. A carriage 8 is slidably mounted on the base 6 and may be reciprocated by any suitable mechanism such as a worm 9 which engages with a rack 10 on the base. The worm is mounted on a shaft 11 which is driven by gears 12 and 13 from a transverse shaft 14 which in turn is driven by a sprocket 15, chain 16 and sprocket 17 from a shaft 18. This shaft is driven by means of a gear 19 which meshes with a pinion 20 on the shaft of the motor 21. Any suitable reversing mechanism (not shown) may be used for reversing the movement of the worm or the motor 21 may be reversed for this purpose.

The main cutter bars 22 are pivotally mounted in the front end of the carriage 8 and carry the cutter chains 23. In order that the machine may cut with sufficient clearance for itself, the outer cutter bars 22' are made somewhat shorter than the inner bars and the chains carried by these bars are driven by the other cutter chains. The cutter chains 23 are driven by means of sprockets 24 on a shaft 25 which is mounted in the forward end of the carriage. They are also supported by guide sprockets 26 at the outer ends of the bars, these sprockets being mounted on a shaft 27 carried by the bars. The short chains 23 carried by the cutter bars are mounted on the sprockets 26 and on sprockets 26' which are mounted on a shaft 29 are also carried by the bars. The sprockets may be of the regular form but I prefer to make them somewhat eccentric as shown in Figure 2 in order to give a variable motion to the chains and also to cause the bits passing around the forward sprockets to move in and out toward the face of the coal. The upper portions of the chains run through guides 28 carried by the bars 22, these guides being sufficiently wide so that they make a complete floor or platform across the top of the cutting apparatus. The shaft 25 may be driven in any convenient manner as by means of a sprocket 29', chain 30 and sprocket 31 on the shaft 18. The cutter chains are driven so that their lower reaches move outwardly and their upper reaches move inwardly toward the machine.

The cutting mechanism is swung up and down by means of an arm 32 which is connected with a yoke or clevis 33 which is secured to one end of a cable 34. A spring 35 is arranged between the end of the cable and the clevis so as to provide a yielding connection. The cable 34 is wound on a drum 36 which is driven by gears 37 and 20 from the motor 21. A clutch 38 of any suitable character is provided for controlling the movement of the drum 36. When the cable is wound on the drum, the cutting mechanism will be swung upwardly as indicated by the dotted lines in Figure 1 showing the cut.

In order to prevent the scattering of the coal as it moves back along the top of the cutting apparatus, I provide a telescoping chute or guard which has a stationary section 39 and a movable section 40. The movable section has an upwardly extending lip or projection 41 which is curved so that it may slide over the face of the coal and this section is held in advanced position by means of any suitable mechanism such as springs 42 which are mounted on rods 43 and engage with abutments 44 and 45 on the two sections of the chute.

As the coal passes back it is discharged onto a chute or plate 46 and passes to a conveyer 47 which extends to the rear of the machine and is adapted to discharge the coal to cars 48. The conveyer 47 may be driven by any suitable means and in the arrangement shown is driven by the chain 30 which engages with a sprocket 49 on the end of the conveyer shaft 50.

The usual operation of the machine will be to lower the outer ends of the cutter bars so that the chains will first make a sumping cut under the coal as shown in Figure 1, by moving the carriage forwardly. During this cutting the guard 40 will be gradually pressed backwardly with respect to the cutter bars after it strikes the face of the coal. When this sumping cut has been made the carriage will be stopped and the cable 34 wound up in order to raise the outer ends of the cutter bars so as to make an upper cut as indicated in Figure 1. It will be seen that during this upper cut, the various cutter chains are all cutting outwardly toward the face and the loose pieces of coal will be dragged out and conveyed back with the cuttings. After the upper cut has been completed the carriage may be moved backwardly with the cutter arms in raised position so as to cut out the small triangular section left at the roof of the mine. After this cut has been completed, the cutter arms are then lowered and the entire machine is moved forwardly for making the next cut. However, considerable time and labor may be saved by another method of operation. In accordance with this method the carriage moves forwardly on the sub-base or frame as the sumping cut is being made. Then when the cutter arms are making their upward movement the carriage feeding mechanism is reversed and this will force the sub-base or frame 6 forwardly so that it will be in position for making the next cut. This forward movement of the sub-base may be made while the cutter chains are in operation or in some cases the cutter arms may be stopped at the proper angle and then the sub-base moved forward while the chains are idle. In each instance the cutter arms serve in the nature of an anchor for pulling the base forward and this will avoid the necessity of moving the machine up by hand or other means and consequently will avoid the loss of time incident thereto. Furthermore, on account of the eccentric mounting of the chain sprockets, the chains have a variable longitudinal movement as well as a small reciprocating movement of the bits as they pass around the sprockets. This will permit the bits to attack the coal in an efficient manner for loosening or breaking the same. Furthermore as some of the sprockets are smaller than the others, there will be projecting ridges of coal which will be easily broken off by the intermediate chains. From this description it will be seen that I provide an improved form of machine which will serve to excavate or mine all of the coal and deliver the same into the coal cars with but little manual labor. It will also be noted that the parts may be arranged in various ways in order to adapt the machine to different conditions and the operation may be varied by different operators in order to get the best results with the character of material to be mined. Having thus described my invention, what I claim and desire to secure by Letters Patent is:

1. A mining and loading machine comprising a base, a carriage mounted on said base, means for reciprocating said carriage, a conveyer arranged in the carriage and extending backwardly to discharge into coal cars, means for actuating said conveyer, a cutter chain support pivotally mounted in the front of the carriage, a plurality of cutter chains mounted on said support and adapted to excavate a passageway of sufficient width to clear the machine, means for actuating said cutter chains, said chains being driven so that the upper reaches will move backwardly toward the machine and deliver the excavated material to the conveyer and means for swinging the cutter chain support in a vertical direction.

2. A mining and loading machine comprising a base adapted to be moved on the floor of the mine, a carriage mounted on said base, a rack and worm for reciprocating the carriage, a conveyer mounted in the carriage and extending backwardly of the machine, means for driving said conveyer, cutter bars pivotally mounted at the front of the carriage, means for swinging said bars, eccentric driving and guiding sprockets at the inner and outer ends of the arms, means for turning the driving sprockets and cutter chains mounted on said sprockets and adapted to deliver the excavated material to the conveyer.

3. In a mining machine, the combination of a support, a plurality of cutter bars arranged adjacent to each other and pivotally mounted on said support, an arm extending upwardly from said bars, a winding drum, a cable from the winding drum to the arm and means for actuating said drum whereby the arm may be raised and lowered and the cutter bars will take out all of the material in advance of all of the bars.

4. In a mining machine, the combination of a plurality of guide bars and chain guides adapted to form a table for supporting excavated material, a plurality of chains mounted on said bars and a telescoping chute co-acting with the bars to form a passageway for the excavated material, the outer end of said chute having a curved projection for engagement with the face of the material to be excavated.

5. A cutter chain having an eccentric driving sprocket and an eccentric guide sprocket and shafts for said sprockets, said sprockets being arranged with their centers in the same relative positions with respect to the shafts on which they are mounted.

6. An eccentric guide wheel for supporting a cutter chain where it enters the material to be excavated.

7. In a mining machine, the combination of a support, a shaft mounted in said support, a plurality of cutter bars arranged adjacent to each other and pivotally mounted on said shaft, shorter cutter bars at the sides of the first named bars, a shaft mounted at the inner ends of said shorter bars and having sprocket wheels thereon, driving sprockets on the first named shaft, means for driving said shaft and cutter chains co-acting with the sprockets on the respective bars, the arrangement being such that the cutter chains on the shorter bars will be driven by the other chains.

8. In a mining machine, the combination of a movable support, cutter bars and chains mounted at the forward end of said support and adapted to swing vertically, a telescoping chute coacting with said cutter bars, an arm projecting upwardly from said bars, a cable, a yielding connection between the cable and arm and a winding drum for said cable.

9. In a mining and loading machine, the combination of a movable base frame, a carriage slidably mounted on said frame, a motor on said carriage, means actuated by the motor for reciprocating the carriage, combined cutting and conveying mechanism arranged at the forward end of the carriage for cutting and conveying the material to be excavated, said cutting and conveying mechanism comprising a plurality of cutter bars and chains arranged adjacent to each other, and means for supporting the material as it is moved by the chains, means for actuating the cutting mechanism from said motor, a conveyer mounted in said carriage and adapted to receive the excavated material and means for actuating the conveyer from the motor.

10. A mining machine comprising a base, a carriage slidably mounted on said base, means for feeding said carriage, a cutter bar secured to said carriage, one or more cutter chains provided with cutter bits, mounted on said bar and arranged in vertical planes, sufficiently close to each other to excavate all of the material in advance of the cutter bar and means for driving said chains, whereby the upper portions thereof will move outwardly as the chains are fed into the coal, the arrangement being such that the material will be carried up and back along the upper portions of the chains and discharged at the rear thereof.

11. A mining machine comprising a relatively fixed base, a carriage movable longitudinally of said base, means for feeding said carriage, a support mounted on said carriage, an endless flexible carrier mounted on said support, cutter bits mounted in said carrier, means for driving said carrier so that it moves out and then up and back over the support to excavate the material and carry it backwardly, means for assisting the carrier to support the material as it is moved backwardly and a conveyer adapted to receive the excavated material and convey it away from the carrier.

12. In a mining machine, the combination of a plurality of cutter chains having cutter bits and arranged in parallel relation and in proximity to each other, means for driving said chains to cut the material and convey it back over the upper horizontal portions thereof, and a conveyer adapted to receive such material and convey it to the cars or the like.

13. In a mining machine, the combination of a cutter frame, a plurality of endless chains for said cutter frame, provided with cutting bits for cutting the coal, said chains being arranged in parallel relation, means for driving said chains, and means for moving said frame to cause the cutting devices to engage with the coal and carry the coal up and back along the upper portion of said frame.

WALTER J. WILSON.